US007228500B2

(12) United States Patent
Calvert et al.

(10) Patent No.: US 7,228,500 B2
(45) Date of Patent: Jun. 5, 2007

(54) WEB PAGE RENDERING PRIORITY MECHANISM

(75) Inventors: Simon Calvert, Issaquah, WA (US); Ting-Hao Yang, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 129 days.

(21) Appl. No.: 11/204,833

(22) Filed: Aug. 15, 2005

(65) Prior Publication Data
US 2006/0015810 A1 Jan. 19, 2006

Related U.S. Application Data

(63) Continuation-in-part of application No. 10/461,781, filed on Jun. 13, 2003.

(51) Int. Cl.
*G06F 15/00* (2006.01)
*G06F 17/00* (2006.01)
*G06F 3/00* (2006.01)
*G06F 9/45* (2006.01)

(52) U.S. Cl. .............. 715/517; 715/513; 715/514; 715/744; 709/203; 717/108; 717/148

(58) Field of Classification Search ............... 715/517, 715/513, 514, 713, 740, 808, 809; 709/203; 171/100, 106, 107, 108, 114, 115, 116, 148
See application file for complete search history.

(56) References Cited

U.S. PATENT DOCUMENTS 5,424,730 A * 6/1995 Sasaki et al. ................. 341/25

| 6,230,309 | B1 * | 5/2001 | Turner et al. ................ 717/107 |
| 6,237,135 | B1 * | 5/2001 | Timbol ........................ 717/107 |
| 6,349,408 | B1 * | 2/2002 | Smith ........................... 717/174 |
| 6,353,923 | B1 * | 3/2002 | Bogle et al. ................. 717/128 |
| 7,120,897 | B2 * | 10/2006 | Ebbo et al. .................. 717/108 |
| 2003/0001442 | A1 * | 1/2003 | Hsu ............................ 310/68 R |
| 2003/0110315 | A1 * | 6/2003 | Upton ......................... 709/328 |
| 2004/0133660 | A1 * | 7/2004 | Junghuber et al. .......... 709/219 |
| 2004/0225995 | A1 * | 11/2004 | Marvin et al. ............... 717/100 |
| 2005/0005243 | A1 * | 1/2005 | Olander et al. ............. 715/747 |
| 2005/0044173 | A1 * | 2/2005 | Olander et al. ............. 709/217 |
| 2005/0108648 | A1 * | 5/2005 | Olander et al. ............. 715/744 |

OTHER PUBLICATIONS

Stephen Walther, "ASP.NET", 2002, pp. 278-307.*

(Continued)

*Primary Examiner*—William Bashore
*Assistant Examiner*—Maikhanh Nguyen
(74) *Attorney, Agent, or Firm*—Workman Nydegger

(57) ABSTRACT

A web page rendering mechanism for generating a web page based on a rendering priority of three or more tiers of rendering instructions. A control object associated with a web page definition representing a second or middle tier of rendering instructions is generated. Next, a rendering priority mechanism is applied. The rendering priority mechanism causes properties associated with the control object found in the first or higher tier of rendering instructions to always be applied to the control object. Properties associated with the control object in the second tier of rendering instructions are applied to the control object if they do not conflict with the properties in the first tier. In like manner, properties associated with the control object in third or lower tier of rendering instructions are applied to the control object if they do not conflict with the properties in the first and second tiers of rendering instructions.

17 Claims, 6 Drawing Sheets

OTHER PUBLICATIONS

Christophe Lauer, "Introducing Microsoft DotNet," Jul. 2002, pp. 1-10.*

Dahalin et al., "Workflow Interoperability Using Extensible Markup Language (XML)", IEEE, Jul. 2002, pp. 513-516.*

Maurer et al., "Component-Level Programming: A Revolution in Software Technology", Department of Computer Science & Engineering, University of South Florida, Tampa, FL, Nov. 1999, pp. 1-5.*

Fertitta et al., "The Role of ActiveX and COM in ATE," IEEE, Sep. 1999, pp. 35-51.*

Can Data Representation and Interface Demands Be Reconciled? Approach in ORCA A.M. van Ginneken, M. De Wilde, E.M. van Mulligan, H. Stam Department of Medical Inofrmatics Erasmus University, Rotterdam, The Netherlands pp. 779-783, 1997 AMIA.

* cited by examiner

WEB PAGE RENDERING PRIORITY MECHANISM

CROSS-REFERENCE TO RELATED APPLICATIONS

This application is a continuation-in-part of U.S. patent application Ser. No. 10/461,781, filed Jun. 13, 2003, which is incorporated herein by reference in its entirety.

BACKGROUND

Computing technology has transformed the way we work and play. For example, a user with a network or Internet-enabled computing system or device with a browser may navigate to thousands of different web sites spread throughout the globe. Navigation involves sending a web page request to a server that maintains the web site, and then receiving markup language representing the web page from the server. The browser then displays the web page on the screen using the markup language representation of the web page.

Conventionally, web pages include interactive elements that when rendered result in control elements that allow a user to have some level of interaction with the web page. For example, the control element may include a button that the user can select with the mouse to perform some function (e.g., a "go" button, a "help" button, a "send" button" and "submit" button, a "next" button or the like). A control element may also be a text box into which a user can input textual information such as address, phone number, search terms, product name, or the like. A control element may also be a label. A more complex control element may be a calendar through which a user may navigate by selecting various views or enter calendar or appointment entries.

There are many technologies that enable the insertion of such controls into a web page. One conventional approach is illustrated with respect to FIG. 5, in which a web page text document 501 (specifically, an ASPX web page document) is converted into a control collection 502, which is then used to render a web page 503 in the form of the markup language (e.g., HyperText Markup Language) that may be directly interpreted by a browser.

In this example, the web page text document 501 includes a reference to a number of control elements including control elements references 512 through 515 that may be interspersed between other static markup language 511 as represented by the vertical ellipses 511A through 511E. Each of the control element references includes one or more attributes specifying behaviors of the control elements. Each of the control element references has an attribute "runat" having a value that indicates that the control element is to be rendered at the server into markup language that can be directly interpreted by the browser. Furthermore, control element reference 512 references a label control element having an identifier attribute of "input" and having a text attribute of "Name:". The control element reference 513 references a TextBox control element. Control element reference 514 references a calendar control element. Control element reference 515 references a button control element having a text attribute of "Go", and having an OnClick attribute that results in a function called "foo" being executed when the user clicks on the corresponding visual representation of the button control element. The function "foo" may be internal or external to the web page text document 501.

The web page text document 501 is parsed and compiled as represented by the arrow 515 into a control collection 502. The control collection 502 includes a number of object classes including the overarching page object class 520 that instantiates page objects that when executed (as represented by arrow 525) renders the web page 503 into the markup language that may be directly interpreted by the browser. For clarity, the web page 503 is illustrated as it would ultimately be presented by the browser, rather than as it is at this stage, namely, a markup language document.

The page object class 520 includes several descendent object classes including a literal class 521 that instantiates literal objects that when executed renders the static markup language portions 531 (as represented by portions 531A and 531B in the web page 503). The page object class 520 includes a descendent label class 522 that instantiates a label object that when executed renders the Label control element 532. The page object class 520 includes a descendent TextBox class 523 that instantiates a TextBox object that when executed renders the TextBox control element 533. The page object class 520 includes a descendent Calendar object class 524 that instantiates a calendar object that when executed renders the Calendar control element 534. Furthermore, the page object class 520 includes a descendent Button object class 525 that instantiates a button object that when executed renders the Button control element 535.

The rendering technology just described is advantageous as it allows flexibility in the functionality of the control elements. In addition, further control elements may be defined as needed for a particular web page. The control elements allow for further attributes that affect the overall look of the control element. For example, the control elements may have an attribute for background color, foreground color, font size, font type, text content, image, templates, complex properties, or the like. By applying specific attributes to the various control elements, the look and feel of the web page may be specified, and may even become recognized as being associated with a particular organization or product thereby enhancing brand recognition.

However, during the design phase of several related web pages, it can be quite time consuming to specify a specific look and feel for each web page. Also, should it be desirable to customize the overall look and feel for several related web pages after they have been designed, each web page would typically have to be altered by meticulously changing the attributes for the control elements in each web page text document.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A web page rendering mechanism for generating a web page based on a rendering priority of three or more tiers of rendering instructions is herein described. The rendering mechanism generates a web page based on a rendering priority of three or more tiers of rendering instructions.

A control object associated with a web page definition representing a second or middle tier of rendering instruc tions is generated. Examples of control objects include, but are not limited to, a label, a textbox, a calendar, or the like.

Next, a rendering priority mechanism of the first, second, and third tiers of rendering instructions is applied. The rendering priority mechanism causes properties associated with the control object, which may include font size, font color, and the like, found in the first or higher tier of rendering instructions to always be applied to the control object. Properties associated with the control object in the second tier of rendering instructions are applied to the control object if they do not conflict with the properties in the first tier. In like manner, properties associated with the control object in the third or lower tier of rendering instructions are applied to the control object if they do not conflict with the properties in the first and second tiers of rendering instructions.

Additional features and advantages will be set forth in the description that follows, and in part will be obvious from the description, or may be learned by the practice of the invention. The features and advantages may be realized and obtained by means of the instruments and combinations particularly pointed out in the appended claims. These and other features will become more fully apparent from the following description and appended claims, or may be learned by the practice of the invention as set forth hereinafter.

BRIEF SUMMARY OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Figure 1:
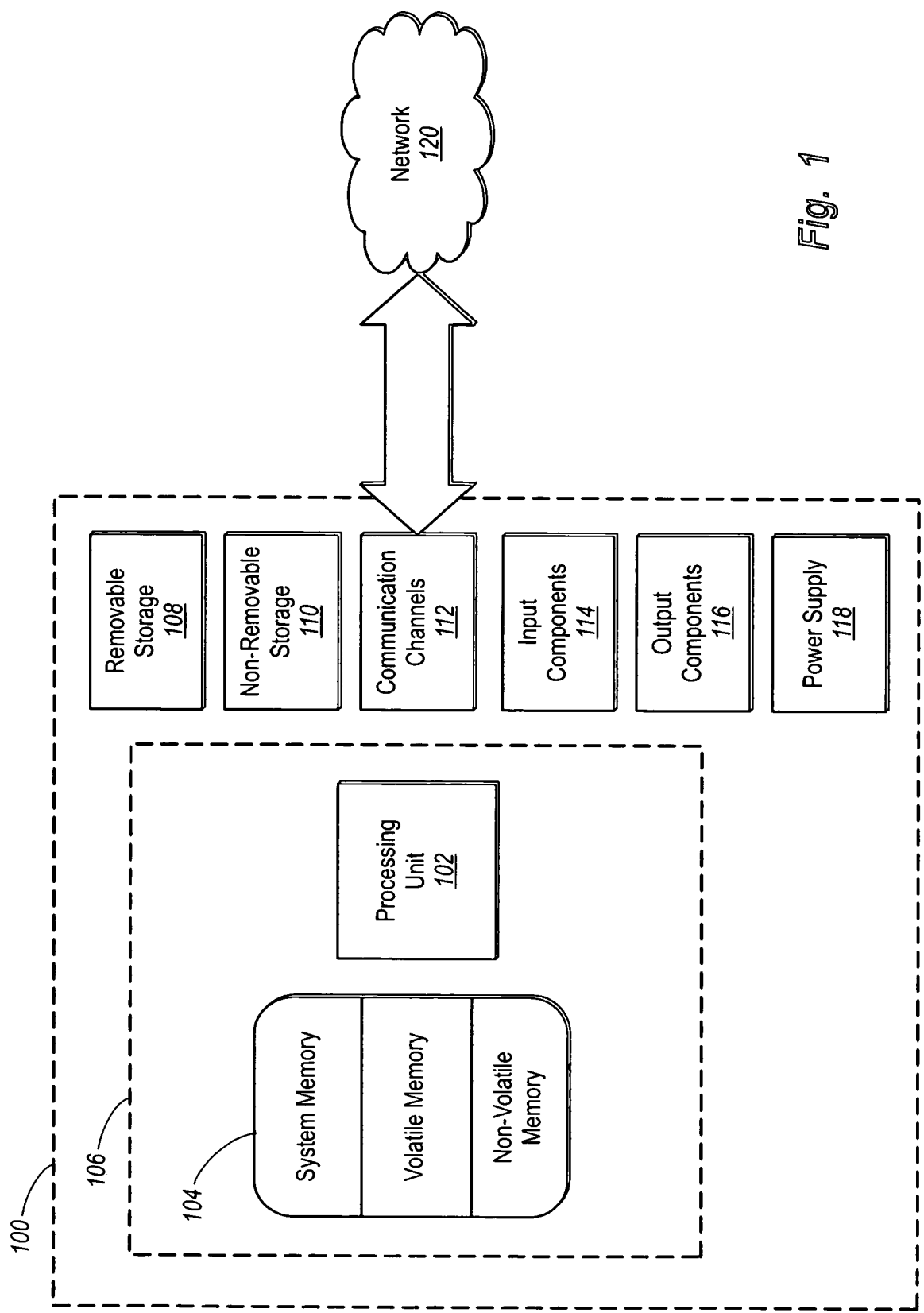
FIG. 1 illustrates a suitable computing system in which the principles of the present invention may be implemented.

A web page rendering mechanism for generating a web page based on a rendering priority of three or more tiers of rendering instructions is herein described. A control object associated with a web page definition representing a second or middle tier of rendering instructions is generated. Next, a rendering priority mechanism is applied. The rendering priority mechanism causes properties associated with the control object found in the first or higher tier of rendering instructions to always be applied to the control object. Properties associated with the control object in the second tier of rendering instructions are applied to the control object if they do not conflict with the properties in the first tier. In like manner, properties associated with the control object in third or lower tier of rendering instructions are applied to the control object if they do not conflict with the properties in the first and second tiers of rendering instructions.

Turning to the drawings, wherein like reference numerals refer to like elements, the principles of the present invention are illustrated as being implemented in a suitable computing environment. The following description is based on illustrated embodiments of the invention and should not be taken as limiting the invention with regard to alternative embodiments that are not explicitly described herein.

In the description that follows, embodiments of the invention are described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains them at locations in the memory system of the computer, which reconfigures or otherwise alters the operation of the computer in a manner well understood by those skilled in the art. The data structures where data are maintained are physical locations of the memory that have particular properties defined by the format of the data. However, while the principles of the invention are being described in the foregoing context, it is not meant to be limiting as those of skill in the art will appreciate that several of the acts and operations described hereinafter may also be implemented in hardware.

FIG. 1 shows a schematic diagram of an example computer architecture usable for these devices. For descriptive purposes, the architecture portrayed is only one example of a suitable environment and is not intended to suggest any limitation as to the scope of use or functionality of the invention. Neither should the computing systems be interpreted as having any dependency or requirement relating to any one or combination of components illustrated in FIG. 1.

The principles of the present invention are operational with numerous other general-purpose or special-purpose computing or communications environments or configurations. Examples of well known computing systems, environments, and configurations suitable for use with the invention include, but are not limited to, mobile telephones, pocket computers, personal computers, servers, multiprocessor systems, microprocessor-based systems, minicomputers, mainframe computers, and distributed computing environments that include any of the above systems or devices.

In its most basic configuration, a computing system 100 typically includes at least one processing unit 102 and memory 104. The memory 104 may be volatile (such as RAM), non-volatile (such as ROM, flash memory, etc.), or some combination of the two. This most basic configuration is illustrated in FIG. 1 by the dashed line 106.

The storage media devices may have additional features and functionality. For example, they may include additional storage (removable and non-removable) including, but not limited to, PCMCIA cards, magnetic and optical disks, and magnetic tape. Such additional storage is illustrated in FIG. 1 by removable storage 108 and non-removable storage 110. Computer-storage media include volatile and non-volatile, removable and non-removable media implemented in any method or technology for storage of information such as computer-readable instructions, data structures, program modules, or other data. Memory 104, removable storage 108, and non-removable storage 110 are all examples of computer-storage media. Computer-storage media include, but are not limited to, RAM, ROM, EEPROM, flash memory, other memory technology, CD-ROM, digital versatile disks, other optical storage, magnetic cassettes, magnetic tape, magnetic disk storage, other magnetic storage devices, and any other media that can be used to store the desired information and that can be accessed by the computing system.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in software and hardware or hardware are also possible and contemplated.

Computing system 100 may also contain communication channels 112 that allow the host to communicate with other systems and devices over, for example, network 120. Although the network 120 may include any network type (whether now existing or to be developed in the future), examples include Token Ring, Ethernet, Bluetooth, 802.11, USB, 1394, SMS, SOAP over EP, or the like. Communication channels 112 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term computer-readable media as used herein includes both storage media and communications media.

The computing system 100 may also have input components 114 such as a keyboard, mouse, pen, a voice-input component, a touch-input device, and so forth. Output components 116 include screen displays, speakers, printer, etc., and rendering modules (often called "adapters") for driving them. The computing system 100 has a power supply 118. All these components are well known in the art and need not be discussed at length here.

While FIG. 1 represents a suitable operating environment for the present invention, the principles of the present invention may be employed in any computing system that is capable of browsing to network sites. The computing system illustrated in FIG. 1 is illustrative only, and by no means represents even a small portion of the wide variety of environments in which the principles of the present invention may be implemented. In the description and in the claims, a "computing system" is defined broadly as any hardware component or components that are capable of using software to perform one or more functions. Examples of computing systems include desktop computers, laptop computers, Personal Digital Assistants (PDAs), telephones, or any other system or device that has processing capability.

Figure 2:
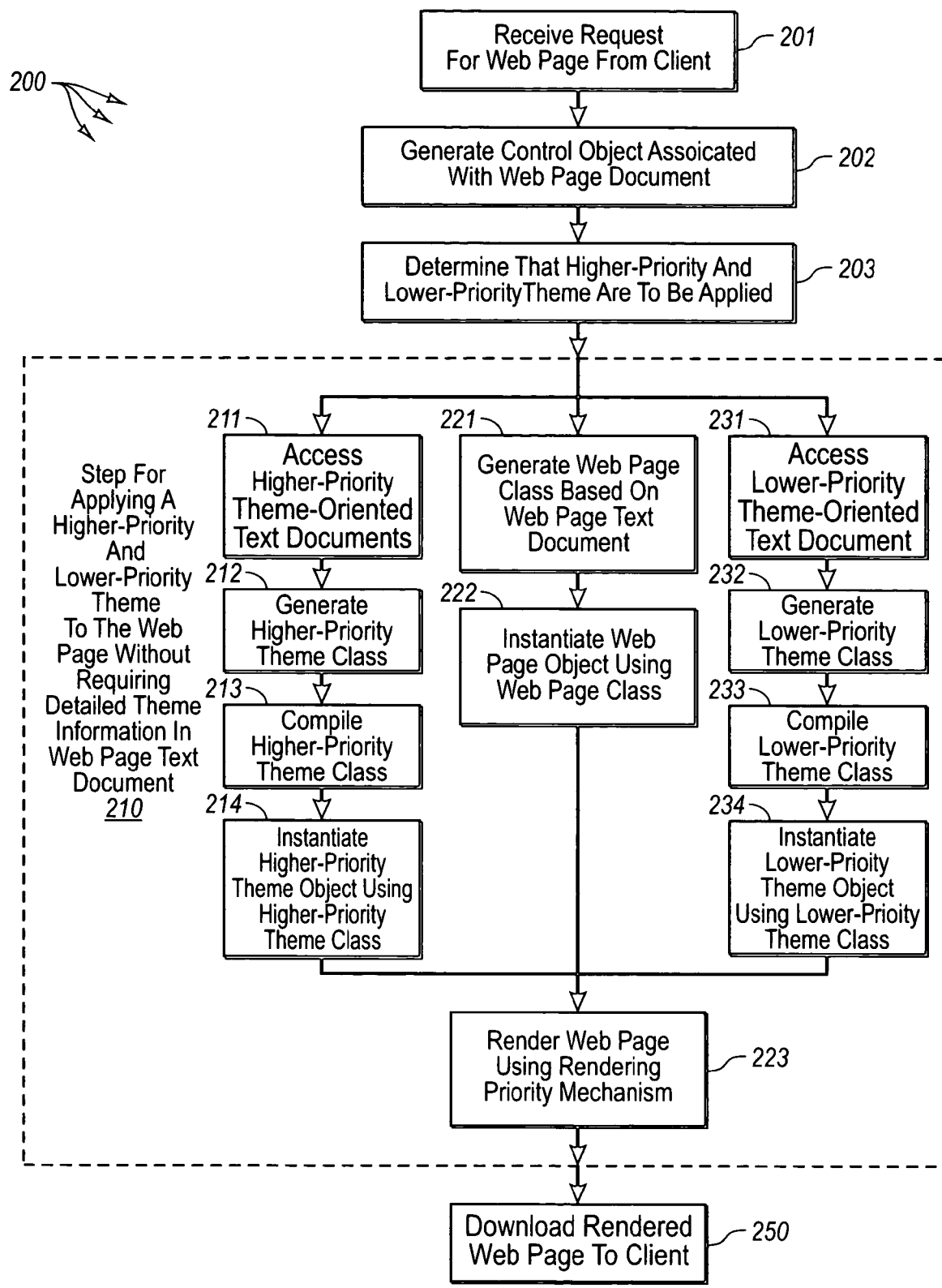
FIG. 2 illustrates a flowchart of a method for generating a web page utilizing a web page rendering priority.
Figure 3A:
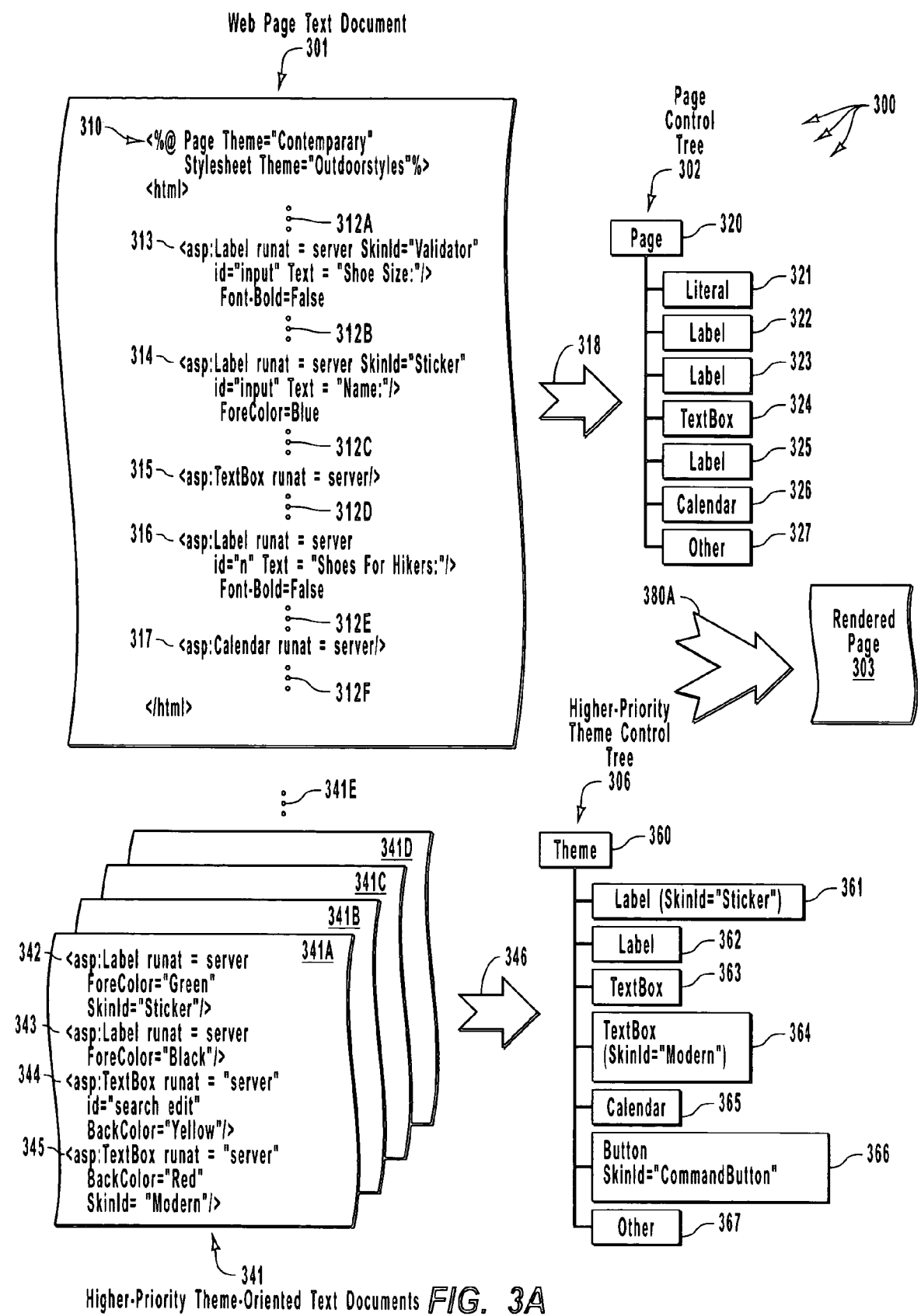
FIGS. 3A and 3B illustrates a data structure process flow associated with FIG. 2.
Figure 3B:
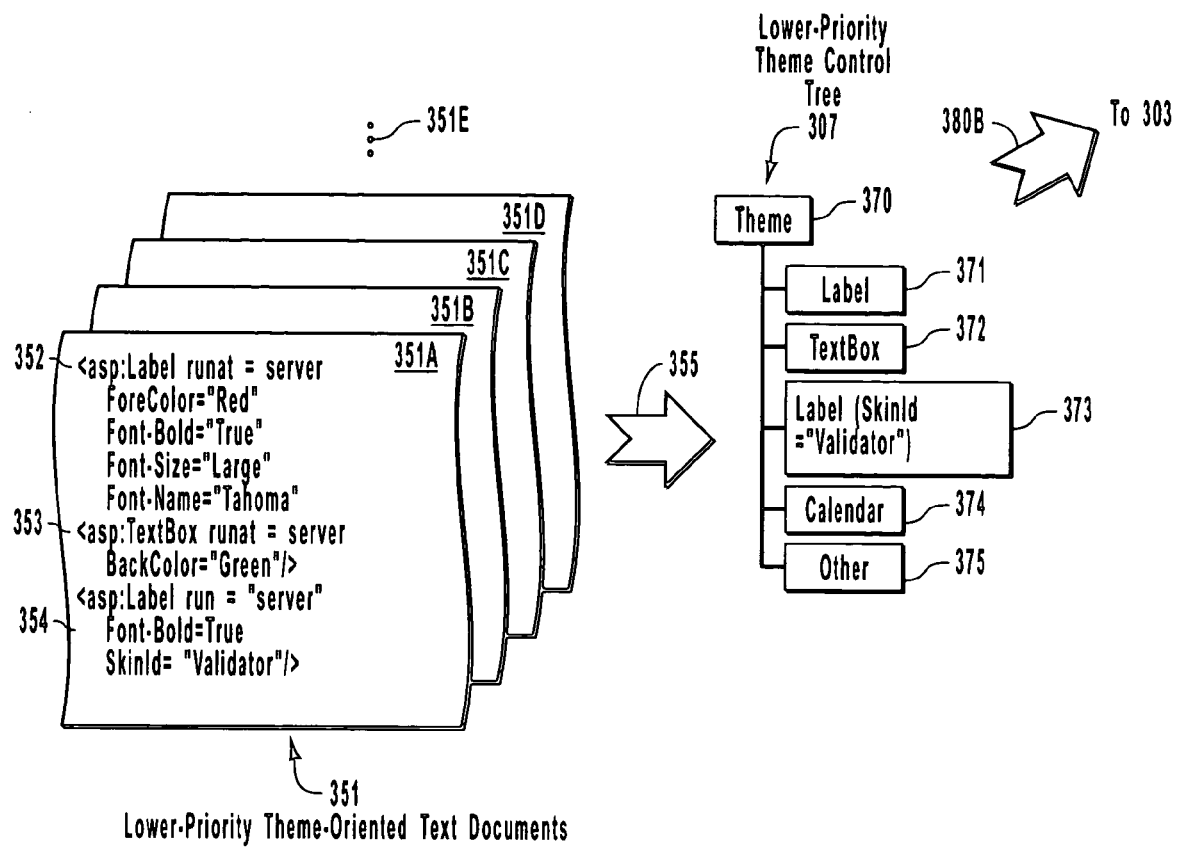

FIG. 2 illustrates a flowchart of a method 200 for a generating a web page from a web page definition in a manner that a higher theme and a lower theme are applied to the web page utilizing a rendering priority without properties associated with the theme being included in the web page definition. FIGS. 3A and 3B illustrate a data structure process flow 300. The data structure process flow 300 of FIGS. 3A and 3B will be described with frequent reference to the method 200 of FIG. 2.

The data structure process flow 300 includes a web page text document 301 that serves as an example of a web page definition. In one embodiment, the web page text document is an ASPX web page document although that is not required. The web page definition may also be extracted from a database or web service. However, in the illustrated embodiment, the web page definition takes the form of the web page text document and thus the principles of the present invention will be described with respect to the web page text document. However, those or ordinary skill in the art will recognize, after having reviewed this description, that the web page from any other web page definition while remaining firmly within the scope of the present invention.

The web page text document 301 includes a directive 310 indicating that a higher-priority theme is to be applied and that the name of the higher-priority theme is "Contemporary". The computing system has access to a number of higher-priority theme-oriented text documents 341 that correspond to this higher-priority theme. There may be other higher-priority theme-oriented documents associated with one or more other higher-priority themes as well. In one embodiment, all higher-priority theme-oriented documents are located in a common directory. The directory may have a number of subdirectories, one for each possible higher-priority theme. Although a number of higher-priority theme-oriented documents (specifically, documents 341A through 341D among potentially other as indicated by the ellipses 341E) are illustrated, there may be only one or any other number of first theme-oriented documents as may be convenient.

In some embodiments, the higher-priority theme and its associated theme-oriented text documents are used for customization of a web page. This allows a customizer to specify a specific look and feel of a web page without being concerned with recoding the web page document. For example, the higher-priority theme-oriented text documents may be created after the web page text document has been created. This allows a customizer to know which control objects and associated properties to specify in the first theme-oriented text documents to make desired changes to the look and feel of the web page without actually changing the web page text document.

The web page text document 301 directive 310 also indicates that a lower-priority theme is to be applied and that the name of the lower-priority theme is "outdoorstyles". Note that in web page document 301, the lower-priority theme is called a stylesheet theme in order to distinguish it from the higher-priority theme. The computing system has access to a number of lower-priority theme-oriented text documents 351 that correspond to this second theme. There may be other lower-priority theme-oriented documents associated with one or more other lower-priority themes as well. In one embodiment, both the higher-priority and lower-priority theme-oriented documents are located in a common directory. In other embodiments, the higher-priority and lower-priority theme-oriented documents may be in separate directories. The directories may have a number of subdirectories, one for each higher-priority or lower-priority possible theme. Although a number of lower-priority theme-oriented documents (specifically, documents 351A through 351D among potentially other as indicated by the ellipses 35 1E) are shown, there may be only one or any other number of lower-priority theme-oriented documents as may be convenient.

In some embodiments, the lower-priority theme and its associated theme-oriented text documents are used during a design phase of multiple web pages and may be included in a web page designer tool, although they are applied in the runtime. It is also possible that a higher-tier theme and its associated theme-oriented text documents are also included in a web page designer tool. A designer may specify a general look and feel for the web page without having to worry about a specific look and feel. A specific look and feel can then be specified later either through use of a higher-priority theme or local definition in the web page text document. For example, the lower-priority theme-oriented text documents may be created prior to the web page text document. This allows a designer the ability to specify general control objects and associated properties, such as background color and font size, that are not important to the look and feel of a specific web page during the design phase and that may be applied to multiple web pages being designed. When the web page text document is created for a specific web page, the designer may then add control objects and associated properties that will give a desired look and feel to the specific web page.

Referring to FIG. 2, the method 200 includes an act of receiving a request for a web page from a client computing system (act 201). This web page is dynamically generated from a web page text document such as the web page text document 301 of FIG. 3A. A control object associated with the webpage document is also generated by the computing system (act 202). In current request/response-oriented protocols (such as HyperText Transport Protocol (HTTP) common for retrieving web pages over networks), web pages are often retrieved in response to a request. However, the principles of the present invention are not limited to application in a request/response oriented environment. The web page may be dynamically constructed for some other reason unrelated to the fulfillment of any particular request received over a network.

When the computing system determines that a web page corresponding to the web page text document is to be constructed (either in response to a request or otherwise), the computing system then determines that the web page corresponding to the web page text document is to have a higher-priority theme and/or a lower-priority theme applied (act 203). This may be accomplished by the computing system reading a directive in the corresponding web page text document. For example, for the web page text document 301, the directive 310 may be read and evaluated. Alternatively, a default rule (e.g., as stated by a configuration setting) may indicate that a higher-priority or a lower-priority theme is to be applied. In that case, if the computing system determines that there is nothing that contravenes the default rule, then the computing system may correspondingly determine that a higher-priority or a lower-priority theme is to be applied. As previously mentioned, there may be multiple higher-priority and lower-priority themes available for rendering. Accordingly, the directive or default rule may also specify which higher-priority or lower-priority theme is to be applied.

The computing system then performs a functional, result-oriented step for applying the higher-priority and lower-priority themes to the web page text document without requiring detailed higher-priority and lower-priority theme information in the web page text document (step 210). The web page text document can be considered a middle priority document. This may include any corresponding acts of accomplishing this result. However, in the illustrated embodiment, the step 210 includes corresponding acts 211 through 214, acts 221 through 223, and acts 231 through 234.

Specifically, the computing system accesses one or more higher-priority theme-oriented text documents that correspond to the higher-priority theme and that collectively describe at least one property to be applied to a control object of the web page text document (act 211). In FIG. 3A, the theme-oriented text documents are represented by theme-oriented text documents 341. In like manner, the computing system also accesses one or more lower-tier theme-oriented text documents that correspond to the lower-tier theme and collectively describe at least one property that may be applied to the control object of the web page document (act 231).

The content of higher-priority theme-oriented text document 341A and lower-priority theme-oriented document 351A is illustrated. Note how the format of the control element references in both theme-oriented documents is similar, if not identical, to the format of the control references in the web page text document 301 for control objects of a common type. Indeed, the schema of the control objects references in the theme-oriented documents may be identical to the schema of the control element references of the web page text document 301 for any given type.

For example, the schema of the control element reference includes for each document, a server side control element having the "asp:" prefix. There may be other prefixes as well in other embodiments. The control object references contain zero or more properties, a "runat" property that has a value that indicates where the corresponding control object is to be rendered into markup language directly interpretable by a browser. In the illustrated embodiment, the "runat" attribute for all control element references has a value of "server" indicating that the entire rendering process for all control objects is to be handled by the computing system that hosts the web page, rather than by any remote browser. Since the schema of the control element references is similar or even identical, the theme-oriented documents may be quite easily constructed by simple cut and paste or copy operations, with minor edits to specify theme-oriented properties.

The computing system then generates a higher-priority theme class based on the one or more higher-priority theme-oriented text documents (act 212). The higher-priority theme class may be represented in source code or other compilable instructions. In one embodiment, the theme class is generated in C. The higher-priority theme class is then compiled into a higher-priority theme class that may be used to instantiate higher-priority theme objects (act 213). Then a higher-priority theme object is instantiated using the compiled higher-priority theme class (act 214). This class generation, compiling, and instantiation operation is represented in FIG. 3A by arrow 346 and results in a theme control collection 306 being generated.

In like manner, the computing system generates a lower-priority theme class based on the one or more lower-priority theme-oriented text documents (act 232). This theme class may also be represented by source code or other compilable instructions and may be generated in C. The lower-priority theme class is then compiled into a lower-priority theme class that may be used to instantiate lower-priority theme objects (act 233). Then a lower-priority theme object is instantiated using the compiled lower-priority theme class (act 234). This class generation, compiling, and instantiation operation is represented in FIG. 3B by arrow 355 and results in a theme control collection 307 being generated.

The computing system also generates a web page class upon which an instance of a web page object may be generated based on the web page text document (act 221). The web page class may be compiled directly from the web page document. Alternatively, the web page class may be generated by first generating an uncompiled web page class (e.g., may include source code or other compilable text)

based on the web page text document, and then compiling the uncompiled web page class into the web page class. Then, the computing system instantiates a web page object using the web page class (act 222).

Figure 4:
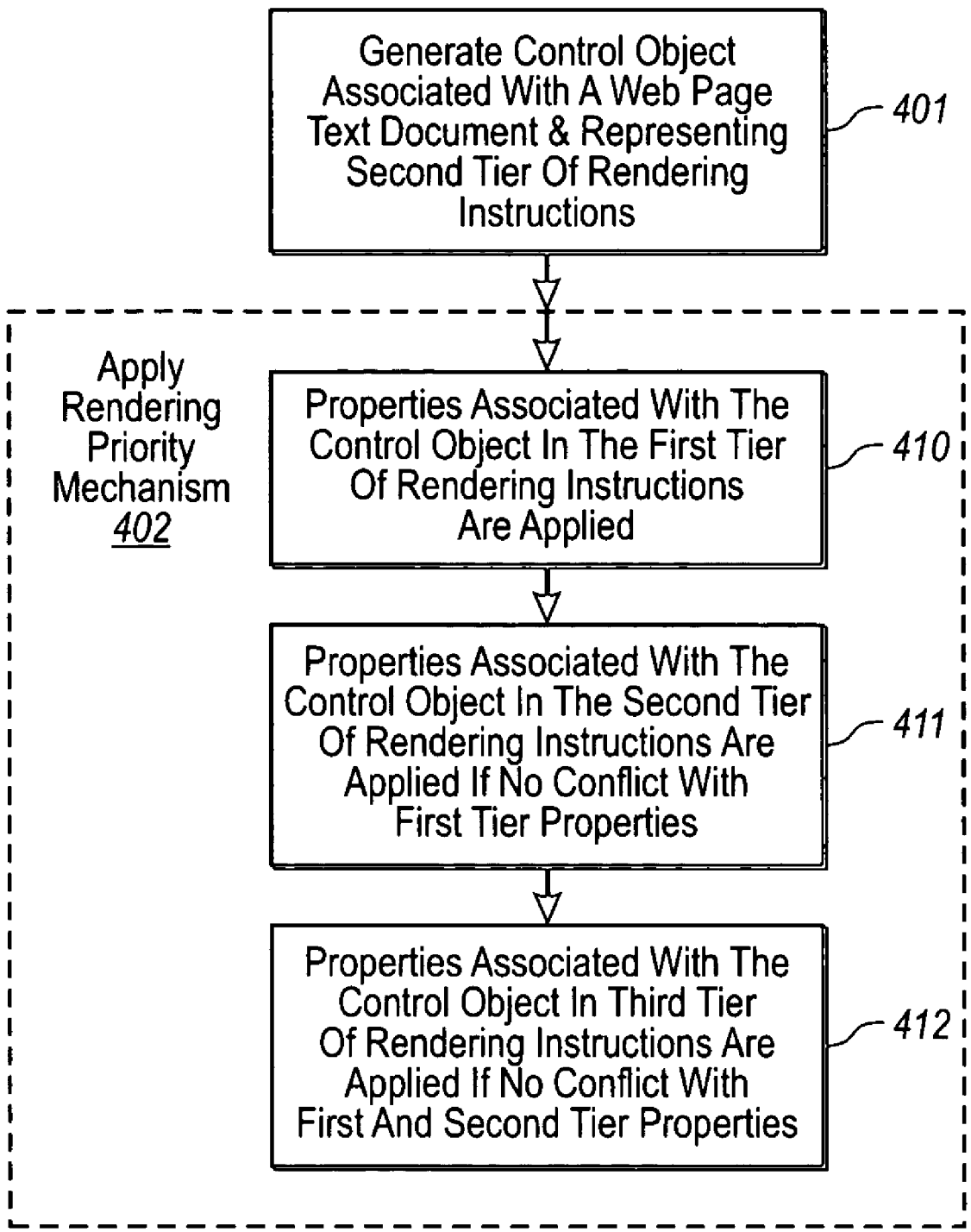
FIG. 4 illustrates a flowchart of a rendering priority mechanism.

The web page is then rendered (i.e., into the markup language that may be directly interpreted by a browser) by utilizing a rendering priority mechanism (act 223). The rendering priority mechanism specifies which properties from the higher-priority theme, the webpage text document (middle priority) and the lower-priority theme are applied to a control object specified in the webpage text document when rendering. The rendering priority mechanism will be described in relation to FIG. 4, which illustrates a flow chart of a method 400 of a rendering priority mechanism.

A control object associated with a webpage text document representing a second tier of rendering instructions is generated (act 401). This act may correspond to act 202 of FIG. 2. For example, a control object may be generated by webpage text document 301. Examples of control objects include, but are not limited to, a label, a textbox, a calendar, or the like.

Next, a rendering priority mechanism for any number of tiers of rendering instructions is applied (act 402). The rendering priority mechanism causes properties associated with the control object, which may include font size, font color, and the like, found in a first tier of rendering instructions to always be applied to the control object (act 410). Properties associated with the control object in the second tier of rendering instructions are applied to the control object if they do not conflict with the properties in the first tier (act 411). In like manner, properties associated with the control object in the third tier of rendering instructions are applied to the control object if they do not conflict with the properties in the first and second tiers of rendering instructions (act 412).

In some embodiments, there may be any number of additional tiers of rendering instructions that are also subjected to the rendering priority mechanism of method 400. For example, properties associated with a fourth tier of rendering instructions can be applied to the control object if they do not conflict with properties in the first, second, and third tiers of rendering instructions. It should be noted that in claims and in the description, the use of "first", "second" and so forth to describe a tier of rendering instructions is not intended to convey any sequential ordering, but is used to merely to distinguish the priority of one tier from another. In some embodiments, properties associated with the first tier are applied first while in other embodiments, properties associated with the first tier may be applied last or in some other order. As mentioned, the order of application of the properties in a tier of rendering instructions is not important to the principles of the present invention.

For example, in a three tier embodiment, a control object for a label can be generated on a webpage text document. The webpage text document can have a font color of blue associated with the label object. In addition, a first tier of rendering instructions can include a red font color associates with a label control object while a third tier of rendering instructions can include a green font color associates with a label control object.

When applying the rendering priority mechanism, the green font color from the third tier of rendering instructions may be applied first to the label control object. The blue font color in the webpage text document is then applied to the label control object. Since the font colors conflict, the blue font color overrides the green font color. The red font color in the first tier of rendering instructions may then be applied to the label control element. In this case, since the font colors conflict, the red font color overrides the blue font color and is applied.

The rendering priority mechanism also works for multiple properties associated with a control object in a tier of rendering instructions. For example, in the three tier embodiment, the third tier of rendering instructions could also include a font size property for the label control object. In that case, the font size property would be applied to the control object along with the green font color. However, since there are no conflicting properties for font size in the second and first tiers, the font size of the third tier is applied. Accordingly, any properties in any tier that do not conflict with a higher priority tier are applied to the control object.

In some embodiments, there may be a collection of properties for a control object in a lower tier and a higher tier of rendering instructions. The properties from the lower tier of rendering instructions can be added to the collection of properties in the higher tier as long as the properties from the lower tier do not conflict with the properties in the higher tier. For example, a collection can be a list in the second or middle tier of rendering instructions that defines a collection of properties, e.g. red, green, and blue. The third or lower level theme may defines a property of black and red. The collection is the sum of these of these colors. In this case, the black property of the third tier is added to the red, green, and blue property of the second tier, while the red property of the third tier is not added as it conflicts. If, however, the first or high priority theme defines white and pale red properties, then the final collection is white and pale red as the first tier has priority over the lower tier.

In other embodiments, there may be a template property. The template property is a special property that can be used to define content, such as markup and other controls. Use of the template allows the content to be applied to the webpage.

In some embodiments, the control object in the second tier of rendering instructions may have properties associated with it that may be marked in a way that state that properties associated with the control object in the first and third tiers of rendering instructions can not be applied to the control object.

Returning to FIGS. 2 and 3, the first theme control collection 306 previously discussed includes a first theme object 360 at its root. The first theme object 360 includes several descendent control objects 361 through 367.

For example, the label control element 361 corresponds to a particular skin having a skin identifier of "Sticker". The label control element 361 is generated by subjecting the control element reference 342 in the original higher-priority theme-oriented text document 341A to the class generation, compilation, and instantiation process of acts 212 through 214. As indicated in the label control object reference 342, the label control object, when executed, will apply a green foreground color to any label control object that invokes the "Sticker" skin.

The label control element 362 does not correspond to any particular skin. Accordingly, the label control element 362 is applied by default to any label control element that does not specify a skin identifier, or that specifies a non-existent skin identifier. The label control element 362 is generated by subjecting the control object reference 343 in the original higher-priority theme-oriented text document 341A to the class generation, compilation, and instantiation process. As indicated in the label control object reference 343, the label control object, when executed, will apply a black foreground color to the label.

The TextBox control object 363 does not correspond to any particular skin. Accordingly, the TextBox control object 363 is applied by default to any TextBox control element that does not specify a skin identifier, or that specifies a non-existent skin identifier. The TextBox control object 363 is generated by subjecting the control element reference 344 in the original higher-priority theme-oriented text document 341A to the class generation, compilation, and instantiation process. As indicated in the TextBox control object reference 344, the TextBox control object, when executed, will apply a yellow background color to the TextBox.

The TextBox control element 364 corresponds to a particular skin having a skin identifier of "Modern". The TextBox control object 364 is generated by subjecting the control object reference 345 in the original higher-priority theme-oriented text document to the class generation, compilation, and instantiation process. As indicated in the TextBox control object reference 345, the TextBox control object, when executed, will apply a red background color to any TextBox control object that invokes the "Modem" skin.

The Calendar object 365 is also generated by subjecting a corresponding Calendar control object reference (not shown) of one of the higher-priority theme-oriented text documents 341 to the class generation, compilation, and instantiation process of acts 212 through 214. The Calendar object 365 does not correspond to a particular skin and thus is applied by default.

The Button object 366 is generated by subjecting a corresponding button control object reference (not shown) of one of the higher-priority theme-oriented text documents 341 to the class generation, compilation, and instantiation process, and corresponds to a skin having an identifier "CommandButton".

The Other object 367 represents that one or more other control element objects may also be generated by subjecting corresponding one or more other control object references (not shown) of one of the higher-priority theme-oriented text documents to the class generation, compilation, and instantiation process.

In FIG. 2, the theme object is instantiated (act 214) after having accessed the higher-priority theme-oriented documents (act 211), generating the higher-priority theme class (act 212) and compiling the higher-priority theme class (213). However, the accessing, generation, and compiling operations of acts 211 through 213 need not be repeated if the theme class already exists due to a previous execution of acts 211 through 213.

In like manner, the lower-priority theme control collection 307 includes a lower-priority theme object 370 at its root. The lower-priority theme object 370 includes several descendent control element objects 371 through 375.

For example, the label control object 371 does not correspond to any particular skin. Accordingly, the label control object 371 will be applied by default to any label control element that does not specify a skin identifier, or that specifies a non-existent skin identifier so long as there is no conflicting properties for the label control object in the higher-priority theme or the web page text document. The label control object 371 is generated by subjecting the control object reference 352 in the original lower-priority theme-oriented text document 351A to the class generation, compilation, and instantiation process of acts 232 through 234. As indicated in the label control object reference 352, the label control object, when executed, will apply a red foreground color, bolded text, a large font size, and the Tahoma font type to the label in the absence of higher priority properties for the label control object.

The TextBox control object 372 does not correspond to any particular skin. Accordingly, the TextBox control element 372 is applied by default to any TextBox control element that does not specify a skin identifier, or that specifies a non-existent skin identifier so long as there is no conflicting TextBox control object in the higher-priority theme or the web page text document. The TextBox control object 372 is generated by subjecting the control object reference 353 in the original lower-priority theme-oriented text document 351A to the class generation, compilation, and instantiation process. As indicated in the TextBox control object reference 353, the TextBox control object, when executed, will apply a green background color to the TextBox in the absence of higher priority properties for the TextBox control object.

The label control object 373 corresponds to a particular skin having a skin identifier of "Validator". The label control object 373 is generated by subjecting the control object reference 354 in the original lower-priority theme-oriented text document to the class generation, compilation, and instantiation process. As indicated in the label control object reference 354, the label control element, when executed, will apply bolded text to any label control element that invokes the "Validator" skin so long as there are no conflicting properties for the label control object in the higher-priority theme or the web page text document.

The Calendar object 374 is also generated by subjecting a corresponding Calendar control object reference (not shown) of one of the lower-priority theme-oriented text documents 351 to the class generation, compilation, and instantiation process of acts 232 through 234. The Calendar object 374 does not correspond to a particular skin and thus is applied by default so long as there is no conflicting properties for the calendar control element in the higher-priority theme or the web page text document.

The Other object 375 represents that one or more other control element objects may also be generated by subjecting corresponding one or more other control element references (not shown) of one of the lower-priority theme-oriented text documents to the class generation, compilation, and instantiation process.

As with the higher-priority theme, the lower-priority theme object is instantiated (act 234) after having accessed the lower-priority theme-oriented documents (act 231), generating the lower-priority theme class (act 232) and compiling the lower-priority theme class (233). However, the accessing, generation, and compiling operations of acts 231 through 233 need not be repeated if the theme class already exists due to a previous execution of acts 231 through 233.

Again referring to FIG. 3A, the web page text document 301 may be subjected to the class generation and instantiation processes of acts 221 and 222 as represented by arrow 318 to generate a page control collection 302 that includes the page object 320 as its root node.

The page object 320 includes several descendent objects including a literal object 321 that, when executed, renders the static markup language portions of the rendered page 303. That literal object is generated by subjecting static portions 312A through 312F of the web page text document 301 to the class generation and instantiation processes of acts 221 and 222.

A descendent label control element object 322, when executed, renders a first Label control object of the rendered page 303. The first label control object 322 is generated by subjecting the first Label control object reference 313 to the class generation and instantiation process. The first label control object will apply the text "Shoe Size:" to the label and will be identified by an identifier "input" as represented by the properties of the first Label control object reference 313. Note also that the first Label control object reference 313 has a corresponding skin identifier attribute of "Validator". Accordingly, when executing the first label control object 322 to generate the first Label control object in the rendered web page 303, the Label control object 373 of the lower-tier theme object 370 will be applied to the control object 313. In this case, the skin identifier property of "Validator will cause the text "Shoe Size" to be bolded. First label control object 313 includes a "font-bold=false" property which is then applied to the control object 313. Since there is a conflict between the properties in the web page text document and the lower-priority theme, the property in the webpage text document overrides the font-bold property in the lower-priority theme and is applied in the rendered web page 303.

A second descendent label control object 323, when executed, renders a second Label control object of the rendered page 303. The second label control object 323 is generated by subjecting Label control object reference 314 to the class generation and instantiation process. The second label control object will apply the text "Name:" to the label and will be identified by an identifier "input" as represented by the properties of the Label control object reference 314. Note also that the second Label control object reference 314 has a corresponding skin identifier property of "Sticker" and specifies a blue fore color. When executing the second label control object 323 to generate the second Label control object in the rendered web page 303, the blue fore color property of the webpage-document is applied to the control object 314. The Label control object 361 of the higher-priority theme object 360 is then applied to the control object to thereby apply the Sticker skin to the control object. Since there is a conflict between the properties in the web page text document and the higher-priority theme, the property in the higher-priority theme overrides the webpage text document property and is applied in the rendered web page 303.

A descendent TextBox control object 324 when executed renders a TextBox control object of the rendered page 303. The TextBox control object 322 is generated by subjecting TextBox control object reference 315 to the class generation and instantiation process. The TextBox control object reference 315 has no corresponding skin identifier property. Accordingly, when executing the TextBox control object 324 to generate the TextBox control object in the rendered web page 303, the back color green property of the lower-tier control object 372 is applied to the control object 324. The back color yellow property of the higher-tier control object 364 is applied to the control object 324. Since there is a conflict between the properties in the lower-priority theme and the higher-priority theme, the back color yellow property in the higher-priority theme overrides the lower-priority theme property and is applied in the rendered web page 303.

A third descendent label control object 325, when executed, renders a third Label control object of the rendered page 303. The third label control object 325 is generated by subjecting Label control object reference 316 to the class generation and instantiation process. The third label control object will apply the text "Shoes for Hikers:" to the label and will be identified by an identifier "11" as represented by the properties of the Label control element reference 316. The Label control element object 316 has no corresponding skin identifier property. Accordingly, when executing the third label control object 325 to generate the third Label control object in the rendered web page 303, the default Label object 371 of the lower-priority theme object 370 will be applied. In particular, the fore color red, bolded font, large font size, and font name "Tahoma" properties will be applied. The font-bold false property of the webpage text document 301 is applied to the control object 316. Since there is a conflict between the properties in the lower-priority theme and the webpage text document, the font-bold false property in the webpage text document overrides the lower-priority theme property Since there is a conflict between the properties in the lower-priority theme and the higher-priority theme, the property in the higher-priority theme overrides the lower-priority theme property and is applied in the rendered web page 303. The properties of the higher-priority theme object 362 are applied. In particular, since the black fore color property conflicts with the red fore color property of the lower-priority theme, the black fore color overrides and is applied in the rendered web page 303. Note that the remaining two properties of the lower-priority theme object 370 are applied to the rendered webpage 303 since there are no conflicting properties in the higher-priority theme and webpage text document.

A calendar control object 326, when executed, renders a calendar control object of the rendered page 303. The calendar control object 326 is generated by subjecting calendar control object reference 317 to the class generation and instantiation process. The calendar control object reference 317 has no corresponding skin identifier property. Accordingly, when executing the calendar control object 326 to generate the calendar control object in the rendered web page 303, the default calendar control element object 365 of the higher-priority theme object 360 will also be executed to thereby apply the theme to the calendar object. Properties of the default calendar control 365 will have priority over properties of the default calendar control object 374 of lower-tier theme object 370.

An other control object 327 represents one or more other control object that may be generated based on other control object references in the web page text document 301.

The rendered web page 303 may include properties from the higher-priority theme, the webpage text document, and the lower-priority theme as illustrated by the arrows 380A and 380B of FIGS. 3A and 3B. If the web page rendering is in response to a client request as in act 301, then the rendered web page may then be downloaded to the client (act 250).

Figure 5:
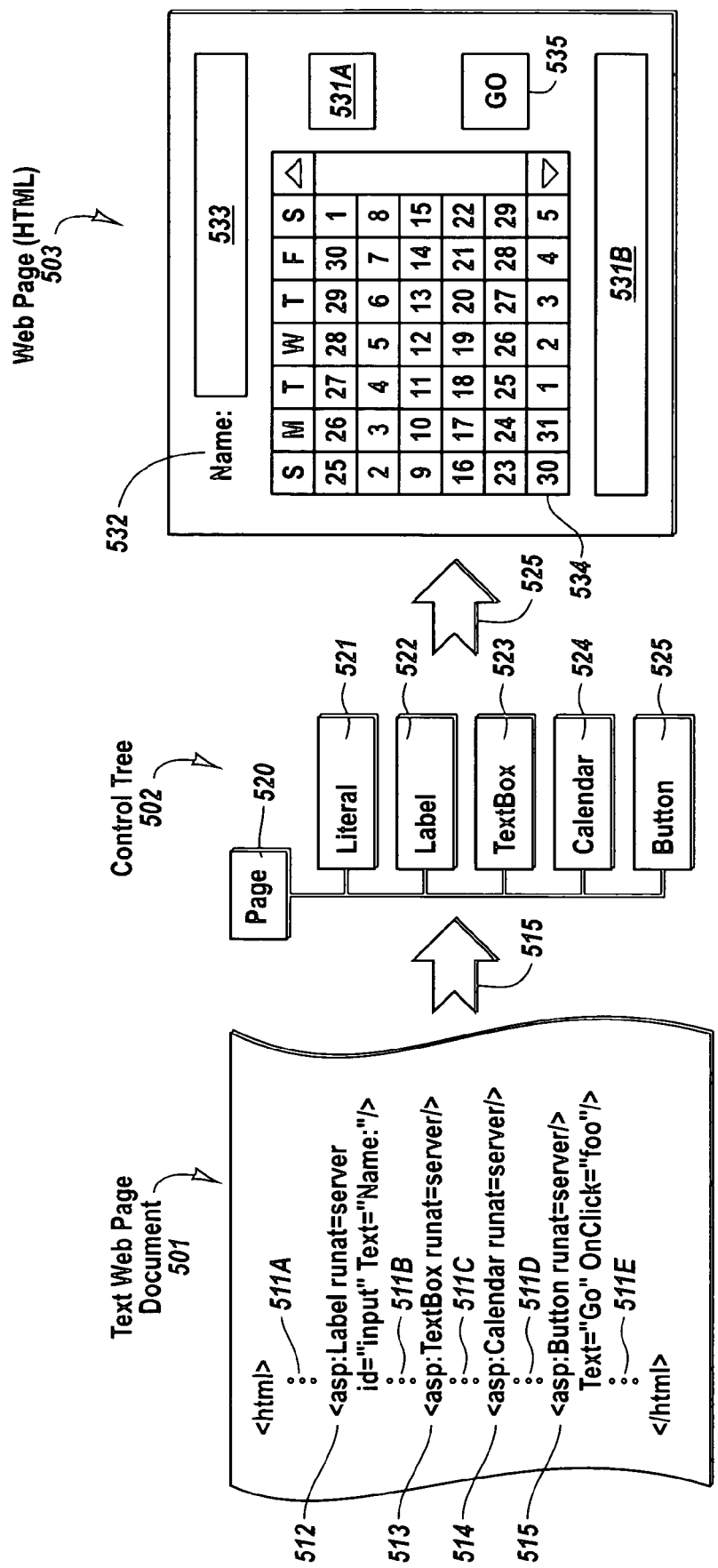
FIG. 5 illustrates a data structure processing flow associated with the rendering process in accordance with the prior art

Although in the example described above with reference to FIGS. 3-5 the page defining the control object is shown as a declarative markup, this is for illustration only and is not meant to limit the claims. It is possible that a web page could define control objects dynamically and dynamically call on the theme(s) to be applied. Also, more than just skin files may apply to the declaration of the theme. There may be other files or resources for a theme that are added in the future, such as resources, master pages, etc. Accordingly, the theme contents are not limited to the control/skin definitions.

Accordingly, the web page rendering priority mechanism has many advantages over the existing art. The use of three or more tiers of rendering instructions allows for easy modifications of the overall look and feel of a web page for different purposes. For example, during the design phase of a web page a lower priority tier of rendering instructions may be created that specifies properties such as background color and font size that may be unimportant during the design of a web page. This may save time and money when developing related web sites. A specific look and feel may then be specified in middle priority tier of rendering instructions such as a web page text document that had priority over the lowest tier. In addition, a higher priority tier of rendering instructions may be used to customize several related web pages after individual web page text documents have be created, thus also saving money and time over individually customizing each related web page text document. The higher priority theme can be applied with literally little or no change to the existing webpage text document. Finally, template property overrides mean that content can be applied to the webpage. Accordingly, the web page rendering mechanism represents a significant advancement in the art.

Although the subject matter has been described in language specific to the structural features and/or methodological acts, it is to be understood that the subject matter defined in the appended claims is not necessarily limited to the specific features and acts described above. Rather, the specific features and acts described above are disclosed as example forms of implementing the claims.

What is claimed is:

1. A method for a computing system generating a web page from a web page definition in a manner that a higher-priority theme and a lower-priority theme are applied to the web page without properties associated with the higher-priority and lower-priority themes being included in the web page definition, the web page definition representing a middle priority and referencing at least one control object that is to be included in the corresponding web page, the computing system utilizing a rendering priority mechanism when rendering the web page wherein properties associated with the control object in the lower-priority theme are applied to the control object only when not conflicting with properties associated with the control object in the higher-priority theme or the web page definition, and properties associated with control object in the web page definition are applied to the control object only when not conflicting with properties associated with the control object in the higher-priority theme, the method comprising the following:

an act of determining that the web page corresponding to the web page definition is to have a higher-priority theme applied;

an act of accessing one or more higher-priority theme oriented text documents that collectively describe at least one higher-priority theme property that may be applied to a control object of the web page definition;

an act of generating a higher-priority theme class based on the one or more higher-priority theme oriented text documents;

an act of compiling the higher-priority theme class into a higher-priority theme class that may be used to instantiate higher-priority theme objects;

an act of instantiating a higher-priority theme object using the compiled higher-priority theme class, the higher-priority theme object including at least a portion that, when executed, causes the at least one higher-priority theme property to be applied to the control object when called by a web page instance corresponding to the web page definition;

an act of determining that the web page corresponding to the web page definition is to have a lower-priority theme applied;

an act of accessing one or more lower-priority theme oriented text documents that collectively describe at least one lower-priority theme property that may be applied to a control object of the web page definition;

an act of generating a lower-priority theme class based on the one or more lower-priority theme oriented text documents;

an act of compiling the lower-priority theme class into a lower-priority theme class that may be used to instantiate lower-priority theme objects;

an act of instantiating a lower-priority theme object using the compiled lower-priority theme class, the lower-priority theme object including at least a portion that, when executed, causes the at least one lower-priority theme property to be applied to the control object when called by a web page instance corresponding to the web page definition and when satisfying the rendering priority mechanism;

an act of generating a web page class upon which an instance of a web page object may be generated based on the web page definition;

an act of instantiating a web page object using the web page class, the web page object including a function call to the portion of the higher-priority theme object that, when executed, causes the at least one higher-priority theme property to be applied to the control object, and the web page object including a function call to the portion of the lower-priority theme object that, when executed, causes the at least one lower-priority theme property to be applied to the control object if no conflicting property to be applied to the control object exists in the first theme object or the web page object; an act of rendering the web page with the control object by executing the web page object; and an act of downloading the rendered web page to a client computing system.

2. A method in accordance with claim 1 further comprising an act of receiving a subsequent request for a second web page;

an act of instantiating a second higher-priority theme object using the complied higher-priority theme class, the second higher-priority theme object also including at least a portion that, when executed, causes the at least one higher-priority theme property to be applied to the control object when called by a web page instance corresponding to the web page definition;

an act of instantiating a second lower-priority theme object using the compiled lower-priority theme class, the second lower-priority theme object also including at least a portion that, when executed, causes the at least one lower-priority theme property to be applied to the control object when called by a web page instance corresponding to the web page definition and when satisfying the rendering priority mechanism;

an act of instantiating a second web page object using the web page class, the second web page object including a function call to the portion of the second higher-priority theme object that, when executed, causes the at least one higher-priority theme property to be applied to the control object and the second web page object including a function call to the portion of the second lower-priority theme object that, when executed, causes the at least one lower-priority theme property to be applied to the control object if no conflicting property to be applied to the control object exists in the second higher-priority theme object or the second web page object; and an act of rendering the second web page with the control object by executing the second web page object.

3. A method in accordance with claim 1, wherein the act of generating a web page class upon which an instance of a web page object may be generated based on the web page definition comprises the following:

an act of generating an uncompiled web page class based on the web page definition; and an act of compiling the uncompiled web page class into the web page class.

4. A method in accordance with claim 1, wherein the act of generating an uncompiled web page class comprises the following:

an act of generating source code that defines the uncompiled web page class.

5. A method in accordance with claim 1, wherein the act of generating a web page class upon which an instance of a web page object may be generated based on the web page definition comprises the following:

an act of compiling the web page text document directly into the compiled web page class.

6. A method in accordance with claim 1, further comprising the following:

an act of receiving a request for the web page from a client computing system.

7. A method in accordance with claim 1, wherein the act of determining that the web page corresponding to the web page definition is to have a higher-priority theme or a lower-priority theme applied comprises the following:

an act of reading a directive from the web page definition.

8. A method in accordance with claim 1, wherein a default rule is that a higher-priority or a lower-priority theme is applied, wherein the act of determining that the web page corresponding to the web page definition is to have a higher-priority or a lower-priority theme applied comprises the following:

an act of determining that there is nothing that contravenes the default rule.

9. A method in accordance with claim 8, wherein the default rule is based on a configuration setting, wherein the act of determining that the web page corresponding to the web page definition is to have a higher-priority or lower-priority theme applied comprises the following:

an act of reading the configuration setting.

10. A computer program product for implementing a method for a computing system generating a web page from a web page definition in a manner that a higher-priority theme and a lower-priority theme are applied to the web page without properties associated with the higher-priority and lower-priority themes being included in the web page definition, the web page definition representing a middle priority and referencing at least one control object that is to be included in the corresponding web page, the computing system utilizing a rendering priority mechanism when rendering the web page wherein properties associated with the control object in the lower-priority theme are applied to the control object only when not conflicting with properties associated with the control object in the higher-priority theme or the web page definition, and properties associated with control object in the web page definition are applied to the control object only when not conflicting with properties associated with the control object in the higher-priority theme, the computer program product comprising the following:

one or more computer-readable storage media having stored thereon computer-executable instructions such that, when executed by one or more processors of the computing system, cause the computing system to perform a method comprising:

an act of determining that the web page corresponding to the web page definition is to have a higher-priority theme applied;

an act of accessing one or more higher-priority theme oriented text documents that collectively describe at least one higher-priority theme property that may be applied to a control object of the web page definition;

an act of generating a higher-priority theme class based on the one or more higher-priority theme oriented text documents;

an act of compiling the higher-priority theme class into a higher-priority theme class that may be used to instantiate higher-priority theme objects;

an act of instantiating a higher-priority theme object using the compiled higher-priority theme class, the higher-priority theme object including at least a portion that, when executed, causes the at least one higher-priority theme property to be applied to the control object when called by a web page instance corresponding to the web page definition;

an act of determining that the web page corresponding to the web page definition is to have a lower-priority theme applied;

an act of accessing one or more lower-priority theme oriented text documents that collectively describe at least one lower-priority theme property that may be applied to a control object of the web page definition;

an act of generating a lower-priority theme class based on the one or more lower-priority theme oriented text documents;

an act of compiling the lower-priority theme class into a lower-priority theme class that may be used to instantiate lower-priority theme objects;

an act of instantiating a lower-priority theme object using the compiled lower-priority theme class, the lower-priority theme object including at least a portion that, when executed, causes the at least one lower-priority theme property to be applied to the control object when called by a web page instance corresponding to the web page definition and when satisfying the rendering priority mechanism;

an act of generating a web page class upon which an instance of a web page object may be generated based on the web page definition;

an act of instantiating a web page object using the web page class, the web page object including a function call to the portion of the higher-priority theme object that, when executed, causes the at least one higher-priority theme property to be applied to the control object, and the web page object including a function call to the portion of the lower-priority theme object that, when executed, causes the at least one lower-priority theme property to be applied to the control object if no conflicting property to be applied to the control object exists in the first theme object or the web page object;

an act of rendering the web page with the control object by executing the web page object; and an act of downloading the rendered web page to a client computing system.

11. A computer program product in accordance with claim 10, wherein the method further comprises:

an act of receiving a subsequent request for a second web page;

an act of instantiating a second higher-priority theme object using the complied higher-priority theme class, the second higher-priority theme object also including at least a portion that, when executed, causes the at least one higher-priority theme property to be applied to the control object when called by a web page instance corresponding to the web page definition;

an act of instantiating a second lower-priority theme object using the compiled lower-priority theme class, the second lower-priority theme object also including at least a portion that, when executed, causes the at least one lower-priority theme property to be applied to the control object when called by a web page instance corresponding to the web page definition and when satisfying the rendering priority mechanism;

an act of instantiating a second web page object using the web page class, the second web page object including a function call to the portion of the second higher-priority theme object that, when executed, causes the at least one higher-priority theme property to be applied to the control object and the second web page object including a function call to the portion of the second lower-priority theme object that, when executed, causes the at least one lower-priority theme property to be applied to the control object if no conflicting property to be applied to the control object exists in the second higher-priority theme object or the second web page object; and an act of rendering the second web page with the control object by executing the second web page object.

12. A computer program product in accordance with claim 10, wherein the act of generating a web page class upon which an instance of a web page object may be generated based on the web page definition comprises the following:

an act of generating an uncompiled web page class based on the web page definition; and an act of compiling the uncompiled web page class into the web page class.

13. A computer program product in accordance with claim 10, wherein the act of generating an uncompiled web page class comprises the following:

an act of generating source code that defines the uncompiled web page class.

14. A computer program product in accordance with claim 10, wherein the act of generating a web page class upon which an instance of a web page object may be generated based on the web page definition comprises the following:

an act of compiling the web page text document directly into the compiled web page class.

15. A computer program product in accordance with claim 10, wherein the method further comprises:

an act of receiving a request for the web page from a client computing system.

16. A computer program product in accordance with claim 10, wherein the act of determining that the web page corresponding to the web page definition is to have a higher-priority theme or a lower-priority theme applied comprises the following:

an act of reading a directive from the web page definition.

17. A computer program product in accordance with claim 10, wherein a default rule is that a higher-priority or a lower-priority theme is applied and is based on a configuration setting, wherein the act of determining that the web page corresponding to the web page definition is to have a higher-priority or a lower-priority theme applied comprises the following:

an act of reading the configuration setting; and an act of determining that there is nothing that contravenes the default rule.

* * * * *